US012767534B2

(12) United States Patent
Kusunoki et al.

(10) Patent No.: US 12,767,534 B2
(45) Date of Patent: Oct. 20, 2026

(54) SPHERICAL AlN PARTICLES AND METHOD OF PRODUCTION OF SAME, AND COMPOSITE MATERIAL CONTAINING SAME

(71) Applicant: NIPPON STEEL Chemical & Material Co., Ltd., Tokyo (JP)

(72) Inventors: Kazuhiko Kusunoki, Tokyo (JP); Kenya Sato, Tokyo (JP); Hiroto Unno, Tokyo (JP); Ryutaro Numao, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 649 days.

(21) Appl. No.: 18/021,147

(22) PCT Filed: Aug. 18, 2021

(86) PCT No.: PCT/JP2021/030227
§ 371 (c)(1),
(2) Date: Feb. 13, 2023

(87) PCT Pub. No.: WO2022/039200
PCT Pub. Date: Feb. 24, 2022

(65) Prior Publication Data
US 2023/0312343 A1 Oct. 5, 2023

(30) Foreign Application Priority Data
Aug. 20, 2020 (JP) ................................ 2020-139334

(51) Int. Cl.
*C01B 21/072* (2006.01)
*C08K 3/28* (2006.01)

(52) U.S. Cl.
CPC ............ *C01B 21/0726* (2013.01); *C08K 3/28* (2013.01); *C01P 2004/32* (2013.01); (Continued)

(58) Field of Classification Search
CPC ........ C01B 21/072–0768; C01B 21/07; C08K 3/28; C08K 2003/282; C08K 2201/005; (Continued)

(56) References Cited

U.S. PATENT DOCUMENTS

2012/0258310 A1 10/2012 Watanabe et al.
2012/0282469 A1* 11/2012 Nahas .................. C04B 35/443 264/678
2013/0171451 A1 7/2013 Muneoka et al.

FOREIGN PATENT DOCUMENTS

EP 0 472 776 A2 3/1992
JP 62-132711 A 6/1987
(Continued)

*Primary Examiner* — Anthony J Zimmer
(74) *Attorney, Agent, or Firm* — Birch, Stewart, Kolasch & Birch, LLP

(57) ABSTRACT

Aluminum nitride particles which are excellent in high thermal conductivity and useful as a filler for a heat dissipating material and which have good fluidity for improving the fillability, that is, spherical AlN particles containing Zr atoms with respect to Al atoms in an amount of a molar ratio $Zr/Al=4.0\times10^{-4}$ to $4.2\times10^{-2}$, having an AlN conversion rate of 70.0% or more, and having a circularity of 0.85 to 1.00.

6 Claims, 3 Drawing Sheets

(a) (b) (c)

(52) U.S. Cl.
CPC ...... *C01P 2004/51* (2013.01); *C01P 2004/61* (2013.01); *C01P 2004/62* (2013.01); *C08K 2003/282* (2013.01); *C08K 2201/005* (2013.01)

(58) Field of Classification Search
CPC .............. C01P 2004/32; C01P 2004/51; C01P 2004/61; C01P 2004/62; B01J 2/00; C08L 101/00
See application file for complete search history.

(56) References Cited

FOREIGN PATENT DOCUMENTS

| | | | | | |
|---|---|---|---|---|---|
| JP | 4-92864 | A | | 3/1992 | |
| JP | 10-120407 | A | | 5/1998 | |
| JP | 2004-182585 | A | | 7/2004 | |
| JP | 2012-72013 | A | | 4/2012 | |
| JP | 2017-178751 | A | | 10/2017 | |
| JP | 2017-178752 | A | | 10/2017 | |
| JP | 2019-108236 | A | | 7/2019 | |
| KR | 20200029832 | A | * | 3/2020 | ........... C04B 35/581 |
| WO | WO 2011/093488 | A1 | | 8/2011 | |

* cited by examiner (a) (b) (c)

SPHERICAL AlN PARTICLES AND METHOD OF PRODUCTION OF SAME, AND COMPOSITE MATERIAL CONTAINING SAME

FIELD

The present invention relates to spherical aluminum nitride (AlN) particles and a method of production of the same and also to a composite material containing spherical AlN particles used for heat dissipation sheets and other thermal interface materials etc.

BACKGROUND

Along with the rise in power densities of semiconductor devices in recent years, more advanced heat dissipation properties have been sought from the materials used for the devices. Heat dissipation materials include the line of materials called "thermal interface materials" (below, simply referred to as "TIMs"). The amounts used have been rapidly growing. TIMs are materials for easing the thermal resistance of the paths for escape of heat generated from semiconductor devices to heat sinks or the housing etc. Sheets, gels, grease, and other various forms of them are being used.

In general, TIMs are composite materials of thermal conductive fillers dispersed in a resin such as an epoxy or silicone. As such a thermal conductive filler, silica, alumina, and other metal oxides are made much use of. However, sheet-shaped articles made from composite materials using metal oxides have thermal conductivities in the thickness direction of 1 to 3 W/mK or so. Sheet-shaped articles having higher thermal conductivities are being demanded. For this reason, as next generation thermal conductive filler materials used for such sheet-shaped articles, promotion of practical application of boron nitride, aluminum nitride, silicon nitride, and other nitride-based high thermal conductive fillers is expected. Among these, aluminum nitride (AlN) is excellent in electric insulation ability and has a high thermal conductivity, so is promising as a heat dissipating material. To improve the thermal conductivity of heat dissipating materials, it is important to mix in a filler having the high crystallinity of aluminum nitride and having a solid structure in the resin forming the matrix.

Various proposals have been made regarding the method of production of AlN particles in the past. For example, PTL 1 proposes a method of production of spherical aluminum nitride powder comprising supplying spherical granules of alumina ($Al_2O_3$) powder or alumina hydrate ($Al_2O_3 \cdot nH_2O$) powder as a starting material to a reduction nitridation process for performing reduction nitridation.

PTL 2 proposes a method of production of spherical aluminum nitride powder comprising reduction nitridation of a composition containing, with respect to 100 parts by mass of alumina or alumina hydrate, a compound containing a rare earth metal element in 0.5 part by mass to 30 parts by mass and carbon powder in 38 parts by mass to 46 parts by mass in ratio at 1620 to 1900° C. in temperature for 2 hours or more.

PTL 3 proposes spherical AlN particles containing, with respect to 100 wt % weight ratio of the particles as a whole, 0.01 to 0.5 wt % of Y converted to $Y_2O_3$, 0.01 to 0.5 wt % of Si converted to $SiO_2$, and AlN, the AlN contained in a ratio of 60 wt % or more, having a relative density of 90% or more of the theoretical density, and having a circularity of 0.85 to 1.00 and a method of production of the same.

PTL 4 proposes spherical AlN particles containing a compound of one or more of La, Dy, and Er, a compound of Si, and AlN in a specific ratios of, having a relative density of 90% or more of the theoretical density and having a circularity of 0.85 to 1.00, and a method of production of the same.

As the method of obtaining AlN particles, the method of nitridation of spherical alumina particles has been known, but if producing AlN particles by the nitridation reduction method, in the past, due to particle growth, AlN particles were formed with asperities on their surfaces. If including such AlN particles as a filler in a resin to obtain a composite material, due to the asperities on the surfaces, the fluidity of the filler deteriorated and it was difficult to raise the fillability in the resin.

CITATIONS LIST

Patent Literature

[PTL 1] WO2011/093488

[PTL 2] Japanese Unexamined Patent Publication No. 2012-72013

[PTL 3] Japanese Unexamined Patent Publication No. 2017-178751

[PTL 4] Japanese Unexamined Patent Publication No. 2017-178752

SUMMARY

Technical Problem

The present invention has as its object to provide aluminum nitride particles which are excellent in high thermal conduction and useful as a filler for a heat dissipating material and which have good fluidity for improving the fillability and a method of production of the same.

Solution to Problem

The inventors of the present invention engaged in intensive research for the purpose of solving the above problem and as a result discovered that when producing AlN particles by the nitridation reduction method, it is possible to mix the materials of a Zr compound in a specific ratio into alumina powder, alumina hydrate powder, or a mixed powder of these so as to produce spherical AlN particles excellent in surface smoothness. As a result, they discovered that when kneading this with a resin to make a composite material, it is possible to realize spherical AlN particles more excellent in fluidity than the past and able to be applied as TIMs.

The gist of the present invention is as follows:

[1] Spherical AlN particles containing Zr atoms with respect to Al atoms in an amount of a molar ratio $Zr/Al=4.0\times10^{-4}$ to $4.2\times10^{-2}$, having an AlN conversion rate of 70.0% or more, and having a circularity of 0.85 to 1.00.

[2] The spherical AlN particles according to the above [1] wherein the AlN conversion rate is 90.0% or more.

[3] A composite material of a resin and spherical AlN particles containing the spherical AlN particles according to the above [1] or [2] in a resin.

[4] A method of producing the spherical AlN particles according to the above [1] or [2], the method of producing the spherical AlN particles comprising a material mixing step of mixing into an alumina material powder of an average particle size (D50) of 0.05 to 4.00

μm having one or both of an alumina powder and alumina hydrate powder a material powder of a Zr compound in 0.10 to 10.00 mass %, converted to a $ZrO_2$ component, by outer percentage with respect to 100 mass % of the alumina material powder converted to the alumina component, a granulating step of processing the mixture formed in the material mixing step into spherical granules, a carbon powder mixing step of mixing the spherical granules with carbon powder, and a nitridation step of heat treating the mixture formed in the carbon powder mixing step in a nitrogen-containing atmosphere.

[5] The method of producing the spherical AlN particles according to the above [4] wherein the ratio of carbon powder mixed with the spherical granules in the carbon powder mixing step is 20.0 to 40.0 mass % by outer percentage with respect to 100 mass % of alumina material powder in the spherical granules converted to the alumina component.

[6] The method of producing the spherical AlN particles according to the above [4] or [5], in the material mixing step, further mixing into the alumina material powder a carbon powder in 0.3 to 2.1 mass % by outer percentage with respect to 100 mass % of the alumina material powder converted to the alumina component.

Advantageous Effects of Invention

The spherical AlN particles of the present invention have smooth particle surfaces, so are more excellent in fluidity than the past and can be filled densely in a resin as a filler of Al spherical AlN particles able to be used as TIMs, can be used as TIMs and, in particular can form a spherical AlN filler suitable for power devices and other TIM fields.

DESCRIPTION OF EMBODIMENTS

Figure 1:
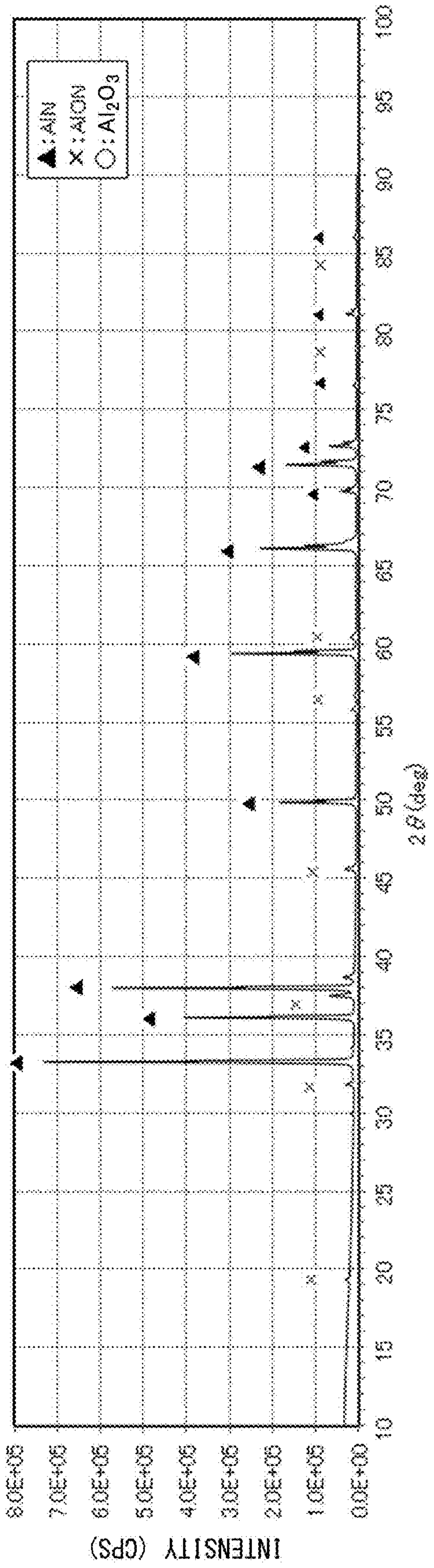
FIG. 1 shows an XRD pattern of powder comprised of the spherical AlN particles of the present invention of Example 10.

The spherical AlN particles of the present invention contain Zr atoms with respect to Al atoms in an amount of a molar ratio $Zr/Al=4.0\times10^{-4}$ to $4.2\times10^{-2}$, have an AlN conversion rate of 70.0% or more, and have a circularity of 0.85 to 1.00.

The spherical AlN particles of the present invention can be produced by the method comprising a material mixing step of mixing into an alumina material powder of an average particle size (D50) of 0.05 to 4.00 μm having one or both of an alumina powder and alumina hydrate powder a material powder of a Zr compound in 0.10 to 10.00 mass %, converted to a $ZrO_2$ component, by outer percentage with respect to 100 mass % of the alumina material powder converted to the alumina component, a granulating step of processing the mixture formed in the material mixing step into spherical granules, a carbon powder mixing step of mixing the spherical granules with carbon powder, and a nitridation step of heat treating the mixture formed in the carbon powder mixing step in a nitrogen-containing atmosphere.

First, the method of production of the spherical AlN particles of one embodiment of the present invention will be explained.

<Material Mixing Step>

(Alumina Material Powder)

As the alumina material powder, any of alumina powder alone, alumina hydrate powder alone, and a mixed powder of alumina powder and alumina hydrate powder may be used. By defining the amount of the alumina component of the alumina material powder as 100 mass % and making the mass % of the material powder of the Zn compound mixed with this, converted to the $ZrO_2$ component, by outer percentage, 0.10 to 10.00 mass %, no matter which alumina material powder is used, similar spherical AlN particles can be produced. The alumina material powder uses alumina material powder with an average particle size (D50) of 0.05 to 4.00 μm. If using an alumina material powder with an average particle size (D50) of smaller than 0.05 μm, the filling rate of the alumina material powder in the granules obtained by granulation and drying in the later explained granulation step easily becomes low. That is, there is little alumina material powder in the granules, so sometimes voids remain in the finally obtained spherical AlN particles. If using larger than 4.00 μm alumina material powder, the strength of the granules is low, the spherically formed granules easily break, and the obtained AlN particles fall in circularity. If the circularity falls, the filling rate when mixed with a resin becomes hard to raise.

The average particle size (D50) of the alumina material powder can be obtained by measurement of the particle size distribution by the laser diffraction method. Further, the specific surface area of the alumina material powder used for the material is preferably 2.0 to 30.0 $m^2/g$. If using alumina material powder with a specific surface area of smaller than 2.0 $m^2/g$, in the heating process in the later explained heat treatment step, sintering of the alumina powder becomes hard to occur, so even if the granules are spherical, sometimes in the process of the alumina being nitrided or the process of the AlN being sintered, the shapes easily become distorted and high circularity AlN particles sometimes cannot be obtained. If using alumina material powder with a specific surface area larger than 30.0 $m^2/g$, sintering easily proceeds in the process of temperature rise in the heat treatment step or at a temperature lower than the temperature where nitridation occurs, air holes at the surface of the alumina granules end up being closed, the nitrogen required for nitridation of the inside is not supplied, and particles low in AlN conversion rate result, so this is not preferable. Note that, the specific surface area can be measured by the BET specific surface area measurement method prescribed in JIS-Z8830.

In this way, by using average particle size (D50) 0.05 to 4.00 μm powder for the alumina material powder, sintering of the alumina powder before nitridation will also proceed, but the nitrided AlN particles also become fine, so the AlN particles easily proceed to be sintered and it is possible to obtain spherical AlN particles with an AlN conversion rate of 70.0% or more.

Alumina hydrate changes to γ, θ, η, δ, and other transition alumina by heat treatment and further changes to α-alumina. As such alumina hydrate, boehmite, diaspore, aluminum hydroxide, etc. may be mentioned.

(Material Powder of Zr Compound)

As the material powder of a Zr compound used for a starting material powder, a powder of zirconium oxide ($ZrO_2$), zirconium carbide (ZrC), zirconium nitride (ZrN), zirconium hydroxide ($Zr(OH)_4$), zirconium chloride ($ZrCl_4$), zirconium acetate ($ZrO(CH_3COO)_2$), zirconium alkoxide, etc. can be used. Preferably, zirconium oxide ($ZrO_2$) powder is used.

In the nitridation step for heat treating granules of alumina powder etc. used as the material, a powder of a Zr compound is effective for suppressing particle growth at the time the alumina powder or other granules is sintered and the time the nitrided AlN particles are sintered and making the surfaces of the obtained spherical AlN particles dense and smooth.

At the time of heat treatment, a solid phase sintering reaction progresses along with the nitridation reaction of the alumina. “Sintering” is the phenomenon of atoms moving between powder particles, contact changing from point contact to planar contact, particles progressively joining with each other to increase density, and the mechanical strength increasing.

Not limited to powder, at the surfaces of solids and liquids, unlike their insides, the atoms, ions, and molecules have nothing to bond with. Such a state is very unstable for a substance. Mass transfer occurs in a direction reducing the surface area of the substance. In the case of the solid ceramic, mass transfer proceeds due to diffusion. Diffusion can be mainly classified as volume diffusion, grain boundary diffusion, and surface diffusion depending on the location where the diffusion occurs. Volume diffusion is diffusion inside of the crystals. Grain boundary diffusion occurs at the grain boundaries between crystals, while surface diffusion occurs at the surface of substances. In addition, interface diffusion occurs at the interface of different substances.

In alumina sintering, the effect of grain boundary diffusion is said to be dominant. As a result of TEM examination of the cross-section of the particles of the present invention, it could be confirmed that most of the $ZrO_2$ is present isolated at the grain boundaries (some present taken inside the particles). $ZrO_2$ is believed to inhibit grain boundary diffusion and suppress crystal grain growth. As a result, the obtained spherical AlN particles are formed with dense smooth surfaces.

The amount of addition of the Zr compound with respect to the material powder at the time of mixing is 0.10 to 10.00 mass % when converting the material powder of the Zr compound to the $ZrO_2$ component by outer percentage with respect to 100 mass % when converting the alumina powder to the alumina component. If the amount of Zr compound when converted to the $ZrO_2$ component is less than 0.10 mass %, the effect of smoothing of the surface of the AlN particles obtained cannot be obtained. Further, if including more Zr compound than 10.00 mass % converted to the $ZrO_2$ component, the amount of formation of the second phase comprised of Al—Zr—O or Al—Zr—N becomes greater, so the relative amount of the AlN excellent in heat dissipation is reduced, so this is not preferable.

If using alumina hydrate in the material mixing step, the amount of hydrate ($n{\cdot}H_2O$) is quantified by TG thermal analysis in advance. If the amount of hydrate is learned, the value of the alumina component with respect to the alumina hydrate can be calculated. Even in the case of a mixed powder of alumina powder and alumina hydrate, the amount of hydrate can similarly be measured by TG thermal analysis to find the value of the alumina component.

(Material Mixing)

As the method for mixing the alumina material powder and material powder of the Zr compound, any method can be used so long as a method able to mix the powder uniformly. For example, it is possible to mix the powder by dry mixing or mix them by wet mixing using water, alcohol, acetone, or another solvent.

<Granulation Step>

As the method of converting the mixture formed in the material mixing step to spherical granules, spray drying, tumble granulation, agitation granulation, flow granulation, or another method can be used. In the method of production of the present invention, the spray drying method is preferable.

If using the spray drying method, it is possible to efficiently process a large amount of a material mixture into spherical granules. If performing granulation by spray drying, it is possible to use a dispersant, binder, or other additive in water or another solvent to obtain granules in which the material mixture is uniformly dispersed and in which the strength is high.

The particle size of the spherical AlN particles obtained by the later nitridation step is substantially the same as the particle size of the granules, so by controlling the particle size of the granules in the granulation step, it is possible to obtain spherical AlN particles with the desired particle size.

The granules formed in the granulation step are not excessively dense. Therefore, due to the voids of the primary powder of alumina powder etc., the nitridation reaction in the later explained nitridation step proceeds not only at the surfaces of the spherical AlN particles, but also inside of the granules. For this reason, it is possible to obtain spherical AlN particles with an AlN conversion rate of 70.0% or more.

<Carbon Powder Mixing Step>

(Carbon Powder)

Carbon powder is added to the granules obtained in the granulation step and the result mixed. The ratio of the carbon powder mixed with the granules is preferably 20.0 to 40.0 mass % by outer percentage with respect to the alumina component on the granules as 100 mass %. Note that, if making the material mixing step a batch type and treating the entire amount of the mixed material obtained in the same step in a granulation step to obtain granules, the amount of the alumina component in the entire amount of the mixed material and the amount of the alumina component in the entire amount of the granules become substantially equal, so it can be said to be preferable that the ratio of the carbon powder mixed in be 20.0 mass % to 40.0 mass % by outer percentage with respect to 100 mass %, converted to alumina component, of alumina material powder in the material mixing step.

Further, the carbon powder may also be additionally mixed in the material mixing step before the granulation step. By mixing in carbon powder in the material mixing step as well, it is possible to directly mix graphite powder into the granules and further possible to obtain AlN particles with a high AlN conversion rate. By the presence of carbon powder between the granules, it is possible to keep the granules from melt bonding etc. and being joined. As a result, it is also possible to obtain spherical AlN particles with a higher circularity. Further, since there is carbon acting as a reducing agent in proximity with the alumina powder, the reduction reaction quickly proceeds. For this reason, the following nitridation reaction is also promoted and particles with a high AlN conversion rate can be obtained.

As the carbon powder mixed in the granules in the carbon powder mixing step, activated carbon, graphite, amorphous carbon, or any other form of carbon can be used. The carbon powder should be fine particles, so carbon black (CB) is preferably used. Further, if mixing carbon powder in the material mixing step, it is particularly preferable that the carbon powder be fine particles, therefore using carbon black (CB) is more preferable.

By mixing the carbon powder with the granules and heat treating it in the carbon powder mixing step, the carbon has the effect of reducing the alumina to separate out the oxygen and promote nitridation by nitrogen gas. The spherical AlN particles according to the present invention are increasingly nitrided up to the inside of the granules. The reason is believed to be that carbon contacts the alumina to form CO gas and this CO gas also contributes to reduction of the insides of the alumina granules. The amount of the carbon powder added, as explained above, is preferably 20.0 to 40.0 mass % of carbon powder with respect the alumina component in the granules as 100 mass %. If less than 20.0 mass %, depending on the conditions from the material mixing step to the nitridation step, the alumina will sometimes be insufficiently reduced. On the other hand, if adding 40.0 mass % of carbon, alumina can be sufficiently reduced.

Further, in the material mixing step as well, the amount of addition of carbon powder when mixing in carbon powder is preferably 0.3 mass % to 2.1 mass % by outer percentage with respect to 100 mass %, converted to alumina component, of alumina material powder at the time of the material mixing step. If less than 0.3 mass %, the effect of improvement of the AlN conversion rate sometimes becomes lower. If more than 2.1 mass %, the reduction nitridation reaction is promoted, but when the AlN particles are formed, the locations where carbon powder had been present easily become voids, so sometimes spherical AlN particles with large internal voids result. For this reason, from the viewpoint of securing high thermal conduction, 2.1% mass or less is preferable. Further, the spherical AlN particles prepared by adding carbon powder in more than 2.1 mass % sometimes fall in circularity due to the effect of formation of voids.

<Nitridation Step>

The spherical granules formed in the granulation step can be heat treated in a nitrogen-containing atmosphere at 1700° C. to 1800° C. in temperature to obtain spherical AlN particles. At less than 1700° C. in temperature, a reduction nitridation reaction of the alumina becomes harder to occur and particles with a low AlN conversion rate result, so this is not preferable. If heat treating the particles by a temperature higher than 1800° C., the reduced nitrided spherical AlN particles start to stick together and the particles are joined. At a further higher temperature, the AlN particles start to break down, so this is not preferable.

As the method of heating in the heat treatment, for example, it is possible to place granules in a carbon crucible or other container and heat them by the external heating method of heating from the outside of the container by resistance heating using a carbon heater etc. or high frequency induction heating.

Further, by using the method of heating by microwaves at the time of heating, it is possible to uniformly heat the granules placed in the crucible or other container all the way to the insides and obtain spherical AlN particles by a temperature lower than heat treatment and in a shorter time than by normal external heating.

If using heating by microwaves to obtain spherical AlN particles, by mixing the spherically formed granules and carbon powder and then microwaving the result, it is possible to more efficiently obtain spherical AlN particles since the carbon acts as a heat source due to its good efficiency of absorption of microwaves.

In heat treatment, before the alumina is nitrided, the alumina powder is sintered, whereby the alumina primary particles are joined by necking. A strong skeleton of alumina is formed while the shape of the granules is maintained. At the time of nitridation and formation of spherical AlN particles as well, the nitridation reaction proceeds while the particles maintain their spherical shapes. If Zr remains at the granules, the primary particles of alumina or the nitrided AlN particles can be kept from excessively growing, so spherical AlN particles with smoothened surfaces can be obtained.

<Carbon Removal Treatment>

If adding carbon powder to prepare the spherical AlN particles, to remove the carbon, it is preferable to heat the particles in an oxidizing atmosphere at 400° C. to 800° C. in temperature to remove the carbon by oxidation. For the simplest oxidation, it is best to heat it in an air atmosphere. At this time, the surface-most layers of the spherical AlN particles are oxidized and oxide-rich layers are formed. These oxide-rich layers have the role of preventing the AlN from reacting with moisture and forming $NH_3$. The structures of the surface-most layers of the AlN particles can be examined by cross-sectional TEM. If analyzing the elements by an EDS (energy dispersive X-ray spectroscopy) apparatus at the time of TEM examination, it is possible to quantify the amounts of presence of Al, O, and N. Further, if analyzing a plurality of particles by XPS (X-ray photoelectron spectroscopy), it is possible to determine the composition of elements forming the surfaces of the AlN particles and the state of chemical bonds. Further, if spattering Ar ions while performing the XPS analysis, it is possible to obtain the element profile in the depth direction.

Next, spherical AlN particles of still another embodiment of the present invention will be explained.

The spherical AlN particles obtained by the above method of production are spherical AlN particles containing Zr atoms with respect to Al atoms in an amount of a molar ratio $Zr/Al=4.0\times10^{-4}$ to $4.2\times10^{-2}$, having an AlN conversion rate of 70.0% or more, and having a circularity of 0.85 to 1.00.

The spherical AlN particles of the present invention contain Zr atoms with respect to Al atoms in an amount of a molar ratio $Zr/Al=4.0\times10^{-4}$ to $4.2\times10^{-2}$.

The content of Zr in the spherical AlN particles of the present invention is measured by atomic absorption and ICP mass spectrometry (ICP-MS). Note that, the amount of Zr component added in the material mixing step at the time of production does not change throughout the process of production, so the number of moles of the Zr component in the molar ratio prescribed here is the same as the amount of addition, converted to the $ZrO_2$ component, of the material powder of the Zr compound added in the material mixing step of the above-mentioned method of production converted to the number of moles of Zr.

<AlN Conversion Rate>

The spherical AlN particles of the present invention, as explained above, is produced by mixing alumina granules with the carbon powder used as the reducing agent, then is heated in a nitrogen-containing atmosphere and reduced and nitrided. The spherical AlN particles contain, in addition to AlN, the AlON of the reaction intermediate product. In addition, it contains a very fine amount of unreacted alumina and, further, the ZrON and ZrN obtained by nitridation and reduction of the added $ZrO_2$ particles. The AlN conversion rate of the spherical AlN particles of the present invention is 70.0% or more, so it is possible to obtain a high thermal conductivity when mixed with a resin. If the AlN conversion rate is smaller than 70.0%, the unreacted alumina or the reaction intermediate product of AlON or other components with a low thermal conductivity are contained, so the thermal conductivity of the composite when mixed when the resin ends up falling.

The AlN conversion rate of the spherical AlN particles of the present invention is measured by X-ray diffraction analysis. It is calculated by calculating the ratio of intensities of the strongest peaks of the X-ray diffraction patterns of AlN, $Al_2O_3$, and AlON obtained by X-ray diffraction analysis. Specifically, the strongest peaks among the X-ray diffraction patterns exhibited by AlN, $Al_2O_3$, and AlON are respectively selected and the ratio of the peak intensity of AlN when deeming the total of the intensities exhibited by these peaks as 100% is defined as the AlN conversion rate.

Note that, the spherical AlN particles of the present invention contain compounds containing Zr in addition to the above Al compounds. Regarding the Zr compounds, the Zr content can be measured by atomic absorption and ICP mass spectrometry (ICP-MS), but sometimes the form of presence cannot be determined. In this case, it is difficult to calculate the AlN conversion rate considering the Zr compounds. The spherical AlN particles of the present invention are spherical AlN particles containing Zr atoms with respect to Al atoms in an amount of a molar ratio $Zr/Al=4\times10^{-4}$ to $4.2\times10^{-2}$. Therefore, compounds containing Zr in small contents with respect to the Al compounds are not considered. The AlN conversion rate was found assuming particles comprised of $Al_2O_3$, AlN, and AlON.

<Circularity>

The circularity is defined as $4\pi S/L^2$ where S is the projected area and L is the circumference. The circularity of the spherical AlN particles of the present invention is 0.85 to 1.00. By making it this range, a high fluidity is obtained and use as a filler with a good fillability is possible. If the circularity is less than 0.85, numerous distorted particles will be included, so it becomes difficult to raise the fillability resin. The circularity of the spherical AlN particles of the present invention was measured by a commercially available flow type particle image analysis apparatus.

<Particle Size>

The spherical AlN particles of the present invention preferably have an average particle size (D50) of 5 to 150 μm. If the average particle size is more than 150 μm, to prevent AlON from remaining, long heat treatment becomes necessary and time and cost are taken. On the other hand, if less than 5 μm, to prevent agglomeration due to sintering, it becomes necessary to lower the heat treatment temperature and long time treatment becomes required, so time and cost are taken. Note that, the "average particle size" referred to here was found by measurement of the particle size distribution by the laser diffraction method. The average particle size is called the median size. The laser diffraction method was used to measure the particle size distribution and the particle size value giving a cumulative frequency of particle size of 50% was defined as the average particle size (D50).

(Surface Properties of AlN Particles)

The surface properties of the AlN particles can be judged by examination of the appearance of the particles by an SEM. In Table 2 shown below, samples where it appears that pluralities of alumina primary particles are joined by sintering by a grain boundary diffusion mechanism (particle growth) and the surface roughnesses of the particles become larger than the original alumina granules are indicated as "particle growth", while samples where it appears that alumina primary particles are kept from joining and surface roughnesses of the same extent as the original alumina granules are maintained are indicated as "particle growth restrained".

A still further embodiment of the present invention is a composite material of a resin and spherical AlN particles comprised of the spherical AlN particles of the present invention contained in a resin.

As the resin used for the composite material of the present invention, a known resin can be used, but an epoxy resin is preferable. The epoxy resin used for the present application is not particularly limited, but for example a bisphenol A type epoxy resin, bisphenol F type epoxy resin, biphenyl type epoxy resin, phenol novolac type epoxy resin, cresol novolac type epoxy resin, naphthalene type epoxy resin, phenoxy type epoxy resin, etc. may be mentioned. One type among these can be used alone or two or more types with different molecular weights can be used. Among these as well, from the viewpoints of the curability, heat resistance, etc., an epoxy resin having two or more epoxy groups in a molecule is preferable. Specifically, a biphenyl type epoxy resin, phenol novolac type epoxy resin, o-cresol novolac type epoxy resin, an epoxylated novolac resin of phenols and aldehydes, bisphenol A, bisphenol F, bisphenol S, and other glycidyl ethers, glycidyl ester acid epoxy resins obtained by a reaction of phthalic acid or dioic acid or other polybasic acids and epochlorohydrin, a linear aliphatic epoxy resin, an alicyclic type epoxy resin, a heterocyclic type epoxy resin, an alkyl-modified polyfunctional epoxy resin, a β-naphthol novolac type epoxy resin, 1,6-dihydroxy naphthalene type epoxy resin, 2,7-dihydroxy naphthalene type epoxy resin, bishydroxybiphenyl type epoxy resin, and further, to impart flame retardance, an epoxy resin in which bromine or other halogen is introduced etc. may be mentioned. Among these epoxy resins having two or more epoxy groups in a molecule as well, in particular a bisphenol A type epoxy resin is preferable.

Further, for example, in a printed circuit board prepreg and various engineering plastics, a resin other than an epoxy-based one can also be used. Specifically, in addition to an epoxy resin, a silicone resin, phenol resin, melamine resin, urea resin, unsaturated polyester, fluororesin, polyimide, polyamide imide, polyester imide, and other polyamides; polybutylene terephthalate, polyethylene terephthalate, and other polyesters; polyphenylene sulfide, aromatic polyesters, polysulfone, liquid crystal polymer, polyether sulfone, polycarbonate, maleimide modified resin, ABS resin, AAS (acrylonitrile-acrylic rubber-styrene) resin, and AES (acrylonitrile-ethylene-propylene-diene rubber-styrene) resin may be mentioned.

The amount of addition of the spherical AlN particles of the present invention in the composite material is preferably large from the viewpoints of the heat resistance and coefficient of thermal expansion, but usually is 70 mass % or more and 95 mass % or less, preferably 80 mass % or more and 95 mass % or less, more preferably 85 mass % or more and 95 mass % or less. This is because if the amount of spherical AlN particles blended is too small, it is difficult to obtain the effects of improvement of the strength of the material, suppression of thermal expansion, etc., while if conversely too great, the viscosity of the composite material also becomes too great and other problems arise, so practical use as a material becomes difficult.

The composite material of the present invention can include a curing agent, silane coupling agent, etc. in addition to the spherical AlN particles and resin. A curing agent cures the resin, so a known curing agent may be used, but a phenol-based curing agent can be used. As the phenol-based curing agent, one or a combination of two or more of a phenol novolac resin, alkyl phenol novolac resin, polyvinyl phenol, etc. can be used. The amount of the phenol-based curing agent blended is preferably an equivalent ratio with the epoxy resin (phenolic hydroxy group equivalent/epoxy group equivalent) of less than 1.0 and 0.1 or more. Due to this, unreacted phenol curing agent no longer remains and the hygroscopic heat resistance is improved. Regarding the silane coupling agent as well, a known coupling agent can be used. One having an epoxy-based functional group is preferable.

The method of production of the composite material of the present invention is, as one example, as follows: A powder comprised of the spherical AlN particles of the present invention was taken in a container. After that, this spherical AlN powder was mixed with an epoxy resin by kneading them by a mixer "Awatori Rentaro" made by THINKY CORPORATION at atmospheric pressure and reducing the pressure from atmospheric pressure to a vacuum while further kneading to obtain the composite material of the present invention.

EXAMPLES

Below, examples and comparative examples will be shown and the present invention will be explained more specifically. However, the present invention should not be interpreted limited to the following examples.

Fabrication of Spherical AlN Particles

Example 1

As shown in Table 1, to average particle size (D50) 1.00 μm alumina ($Al_2O_3$) powder, $ZrO_2$ powder 1.00 mass % (average particle size 1.0 μm) by outer percentage with respect to that alumina powder 100 mass % and a PVA (polyvinyl alcohol)-based binder, polycarbonate-based dispersant, and water were added and mixed by a ball mill. The obtained mixture was spray dried (CL-8 made by Ohkawara Kakohki Co., Ltd.) to form granules and obtain granules with a Zr/Al molar ratio=$4.14\times10^{-3}$. To the obtained granules, carbon powder (average particle size 5 μm activated carbon) was mixed. The result was placed in a graphite crucible and heat treated in a nitrogen atmosphere at a temperature of 1750° C. for 8 hours. At that time, carbon powder (activated carbon) was mixed in at a ratio of 30.0 mass % with respect to 100 mass % of the alumina component in the granules.

Furthermore, the heat treated powder was heat treated using an electric furnace SUPER-BURN (made by Motoyama Co., Ltd.) in an air atmosphere at 750° C. for 8 hours to remove the residual carbon component and obtain spherical AlN particles.

Example 2

Except for adding 0.50 mass % $ZrO_2$ powder by outer percentage with respect to that alumina powder 100 mass %, the same procedure was followed as in Example 1 to prepare spherical AlN particles. The ratio of the carbon powder (activated carbon) mixed in with respect to the alumina component 100 mass % in the granules was 30.0 mass %.

Example 3

Except for adding 0.10 mass % $ZrO_2$ powder by outer percentage with respect to that alumina powder 100 mass %, the same procedure was followed as in Example 1 to prepare spherical AlN particles. The ratio of the carbon powder (activated carbon) mixed in with respect to the alumina component 100 mass % in the granules was 30.0 mass %.

Example 4

Except for adding 5.00 mass % $ZrO_2$ powder by outer percentage with respect to that alumina powder 100 mass %, the same procedure was followed as in Example 1 to prepare spherical AlN particles. The ratio of the carbon powder (activated carbon) mixed in with respect to the alumina component 100 mass % in the granules was 30.0 mass %.

Example 5

Except for adding 10.00 mass % $ZrO_2$ powder by outer percentage with respect to that alumina powder 100 mass %, the same procedure was followed as in Example 1 to prepare spherical AlN particles. The ratio of the carbon powder (activated carbon) mixed in with respect to the alumina component 100 mass % in the granules was 30.0 mass %.

Example 6

Except for making the heating temperature under a nitrogen atmosphere 1700° C., the same procedure was followed as in Example 1 to prepare spherical AlN particles.

Example 7

Except for making the heating temperature under a nitrogen atmosphere 1800° C., the same procedure was followed as in Example 1 to prepare spherical AlN particles.

Example 8

Example for using average particle size (D50) 0.1 μm alumina powder, the same procedure was followed as in Example 1 to prepare spherical AlN particles.

Example 9

Example for using average particle size (D50) 3.9 μm alumina powder, the same procedure was followed as in Example 1 to prepare spherical AlN particles.

Example 10

To the alumina powder of Example 1, $ZrO_2$ powder 1.00 mass % (average particle size 1.0 μm) by outer percentage with respect to that alumina powder 100 mass % and a PVA (polyvinyl alcohol)-based binder, polycarbonate-based dispersant, and water were added. Further, carbon black (average particle size 20 nm) 0.40 mass % was added. This was mixed by a ball mill and granulated by spray drying. The same procedure was followed as in Example 1 to prepare spherical AlN particles.

Example 11

To the alumina powder of Example 1, $ZrO_2$ powder 1.00 mass % (average particle size 1.0 μm) by outer percentage with respect to that alumina powder 100 mass % and a PVA (polyvinyl alcohol)-based binder, polycarbonate-based dispersant, and water were added. Further, carbon black (average particle size 20 nm) 2.00 mass % was added. This was mixed by a ball mill and granulated by spray drying. The same procedure was followed as in Example 1 to prepare spherical AlN particles.

Comparative Example 1

Except for, as shown in Table 1, not adding $ZrO_2$, but adding to alumina powder 100 mass % a PVA (polyvinyl alcohol)-based binder, polycarbonate-based dispersant, and water, mixing them by a ball mill, then granulating the result by spray drying, the same procedure was followed as in Example 1 to prepare spherical AlN particles.

Comparative Example 2

Except for adding 0.05 mass % $ZrO_2$ powder by outer percentage with respect to alumina powder 100 mass %, the same procedure was followed as in Example 1 to prepare spherical AlN particles.

Comparative Example 3

Except for adding 13.00 mass % $ZrO_2$ powder by outer percentage with respect to alumina powder 100 mass %, the same procedure was followed as in Example 1 to prepare spherical AlN particles.

Comparative Example 4

Except for making the heating temperature under a nitrogen atmosphere 1650° C., the same procedure was followed as in Example 1 to prepare spherical AlN particles.

Comparative Example 5

Except for making the heating temperature under a nitrogen atmosphere 1850° C., the same procedure was followed as in Example 1 to prepare spherical AlN particles.

Comparative Example 6

Except for using average particle size (D50) 0.02 μm alumina powder, the same procedure was followed as in Example 1 to prepare spherical AlN particles.

Comparative Example 7

Except for using average particle size (D50) 4.70 μm alumina powder, the same procedure was followed as in Example 1 to prepare spherical AlN particles.

Comparative Example 8

Except for mixing 19.2 mass % of carbon powder (activated carbon) to the alumina component 100 mass % in the granules, the same procedure was followed as in Example 11 to 20 prepare spherical AlN particles.

Comparative Example 9

Except for adding to the alumina powder of Example 1 a $ZrO_2$ powder 1.00 mass % (average particle size 1.0 μm), PVA (polyvinyl alcohol)-based binder, polycarbonate-based dispersant, and water, further adding carbon black (average particle size 20 nm) 2.20 mass %, mixing them by a ball mill, then granulating the result by spray drying, the same procedure was followed as in Example 1 to prepare spherical AlN particles.

TABLE 1

| Starting material | | Ex. 1 | Ex. 2 | Ex. 3 | Ex. 4 | Ex. 5 | Ex. 6 |
|---|---|---|---|---|---|---|---|
| $Al_2O_3$ | Average particle size (D50), μm | 1.00 | 1.00 | 1.00 | 1.00 | 1.00 | 1.00 |
| | Specific surface area, $m^2/g$ | 5.0 | 5.0 | 5.0 | 5.0 | 5.0 | 5.0 |
| $ZrO_2$ | Amount of addition (mass %) | 1.00 | 0.50 | 0.10 | 5.0 | 10.00 | 1.00 |
| Zr/Al | Molar ratio | 4.14E−03 | 2.07E−03 | 4.14E−04 | 2.07E−02 | 4.14E−02 | 4.14E−03 |
| Carbon black | Amount of addition (mass %) | 0 | 0 | 0 | 0 | 0 | 0 |
| Carbon powder mixing step | Amount of addition of activated carbon with respect to alumina component in granules (mass %) | 30.0 | 30.0 | 30.0 | 30.0 | 30.0 | 30.0 |
| Heat treatment temperature | ° C. in nitrogen atmosphere | 1750 | 1750 | 1750 | 1750 | 1750 | 1700 |

| Starting material | | Ex. 7 | Ex. 8 | Ex. 9 | Ex. 10 | Ex. 11 |
|---|---|---|---|---|---|---|
| $Al_2O_3$ | Average particle size (D50), μm | 1.00 | 0.10 | 3.90 | 1.00 | 1.00 |
| | Specific surface area, $m^2/g$ | 5.0 | 14.8 | 2.0 | 5.0 | 5.0 |
| $ZrO_2$ | Amount of addition (mass %) | 1.00 | 1.00 | 1.00 | 1.00 | 1.00 |
| Zr/Al | Molar ratio | 4.14E−03 | 4.14E−03 | 4.14E−03 | 4.14E−03 | 4.14E−03 |
| Carbon black | Amount of addition (mass %) | 0 | 0 | 0 | 0.40 | 2.00 |
| Carbon powder mixing step | Amount of addition of activated carbon with respect to alumina component in granules (mass %) | 30.0 | 30.0 | 30.0 | 30.0 | 30.0 |
| Heat treatment temperature | ° C. in nitrogen atmosphere | 1800 | 1750 | 1750 | 1750 | 1750 |

TABLE 1-continued

| Material | | Comp. Ex. 1 | Comp. Ex. 2 | Comp. Ex. 3 | Comp Ex. 4 | Comp. Ex. 5 |
|---|---|---|---|---|---|---|
| $Al_2O_3$ | Average particle size (D50), μm | 1.00 | 1.00 | 1.00 | 1.00 | 1.00 |
| | Specific surface area, $m^2/g$ | 5.0 | 5.0 | 5.0 | 5.0 | 5.0 |
| $ZrO_2$ | Amount of addition (mass %) | 0 | 0.05 | 13.00 | 1.00 | 1.00 |
| Zr/Al | Molar ratio | 0 | 2.07E−04 | 5.38E−02 | 4.14E−03 | 4.14E−03 |
| Carbon black | Amount of addition (mass %) | 0 | 0 | 0 | 0 | 0 |
| Carbon powder mixing step | Amount of addition of activated carbon with respect to alumina component in granules (mass %) | 30.0 | 30.0 | 30.0 | 30.0 | 30.0 |
| Heat treatment temperature | ° C. in nitrogen atmosphere | 1750 | 1750 | 1750 | 1650 | 1850 |

| Material | | Comp. Ex. 6 | Comp. Ex. 7 | Comp. Ex. 8 | Comp. Ex. 9 |
|---|---|---|---|---|---|
| $Al_2O_3$ | Average particle size (D50), μm | 0.02 | 4.70 | 1.00 | 1.00 |
| | Specific surface area, $m^2/g$ | 120.0 | 14.8 | 5.0 | 5.0 |
| $ZrO_2$ | Amount of addition (mass %) | 1.00 | 1.00 | 1.00 | 1.00 |
| Zr/Al | Molar ratio | 4.14E−03 | 4.14E−03 | 4.14E−03 | 4.14E−03 |
| Carbon black | Amount of addition (mass %) | 0 | 0 | 0 | 2.20 |
| Carbon powder mixing step | Amount of addition of activated carbon with respect to alumina component in granules (mass %) | 30.0 | 30.0 | 19.2 | 30.0 |
| Heat treatment temperature | ° C. in nitrogen atmosphere | 1750 | 1750 | 1750 | 1750 |

Underlined numerical values show outside scope of invention.

The evaluation of the obtained spherical AlN particles is shown in Table 2.

<Evaluation>

(AlN Conversion Rate)

The average particle size (D50) of the obtained spherical AlN particles was measured by a laser diffraction scattering type particle size distribution measurement apparatus CILAS920 made by CILAS Co., Ltd. For the circularity, about 500 particles were measured using a Sysmex flow type particle image analysis apparatus "FPIA-3000" (made by Spectris Co., Ltd.) For the AlN conversion rate, an X-ray diffraction apparatus "RINT-2500TTR" made by Rigaku Corporation was used to measure the X-ray diffraction patterns. The AlN conversion rate was calculated by measuring the maximum peak intensities of AlN (PDF Card No. 25-1133), alumina (PDF Card No. 10-0173), and AlON (PDF Card No. 48-0686) and finding the AlN conversion rate by a percentage from the ratio of intensities.

Figure 2:
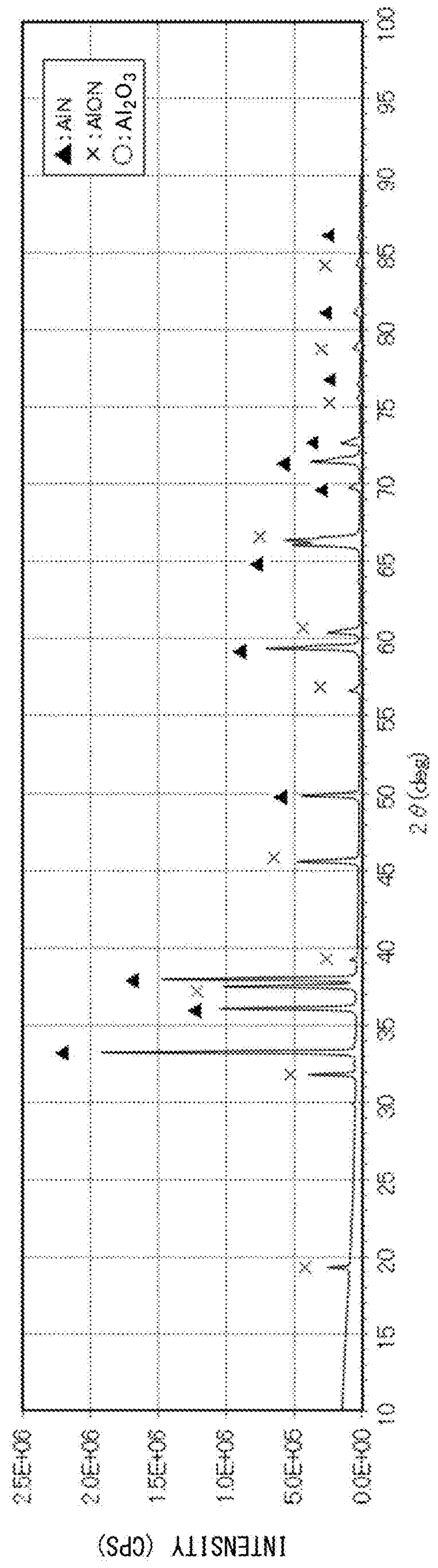
FIG. 2 shows an XRD pattern of powder comprised of the spherical AlN particles of Comparative Example 4.

As an example, an X-ray diffraction (XRD) pattern of powder made of the AlN particles of the present invention of Example 10 is shown in FIG. 1. An XRD pattern of powder made of the AlN particles of Comparative Example 4 is shown in FIG. 2.

(Surface Properties)

The surface properties of the particles were examined by SEM. In Table 2, samples where it appears that pluralities of alumina primary particles are joined by sintering by a grain boundary diffusion mechanism (particle growth) and the surface roughnesses of the particles become larger than the original alumina granules are indicated as "particle growth", while samples where it appears that alumina primary particles are kept from joining and surface roughnesses of the same extent as the original alumina granules are maintained are indicated as "particle growth restrained".

Figure 3:
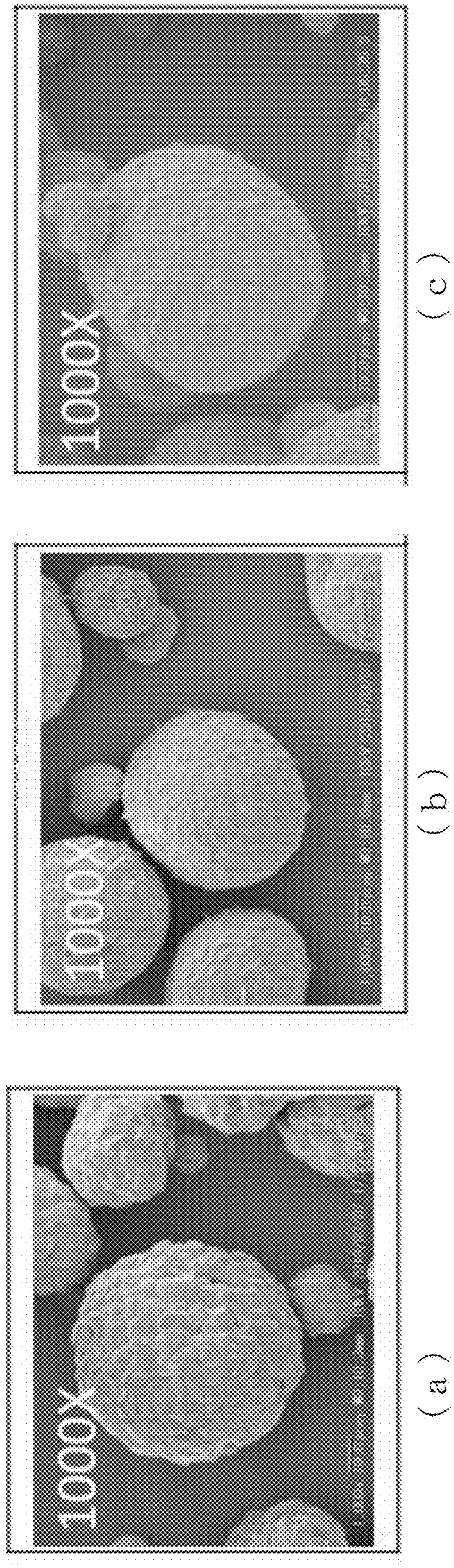
FIGS. 3(*a*) to 3(*c*) show SEM images showing the surface properties of the spherical AlN particles of the examples and comparative examples.

The results of Examples 1 and 4 and Comparative Example 1 are shown in SEM images. The SEM image of spherical AlN particles (Comparative Example 1) without the addition of Zr of the prior art is shown in FIG. 3(*a*). The particle surfaces are very uneven due to the progression of grain growth. On the other hand, SEM images of AlN particles prepared by addition of $ZrO_2$ in 1.00 mass % (Zr/Al=4.14E-03) and 5.00 mass % (Zr/Al=2.07E-02) (Examples 1 and 4) are respectively shown in FIGS. 3(*b*) and 3(*c*).

In Examples 1 and 4, it is learned from the SEM images as well that due to the addition of Zr, asperities of the particle surfaces are suppressed and smooth particle surfaces are obtained.

If comparing Examples 1 to 5 and Comparative Examples 1 to 3, the fact that an amount of addition of Zr, converted to $ZrO_2$ component, of at least 0.10 mass % or more is necessary is learned from the comparison of the results of Example 3 and Comparative Example 2. If $ZrO_2$ is overly added, the amount of formation of the second phase comprised of Al—Zr—O or Al—Zr—N becomes greater, but with an amount of addition of 10.00 mass % (Example 5), restrained grain growth is seen.

(Composite Material of Resin and Spherical AlN particles)

The AlN particles of the examples and comparative examples prepared in the above way were used to prepare composite materials. 40 g of each of the powders comprised of spherical AlN particles was taken in containers. After that, the 40 g of spherical AlN particles was mixed with 10 g of epoxy resin (Epicoat 801N) made by Mitsubishi Chemical Corporation and the result kneaded by a THINKY mixer (Awatori Rentaro) at atmospheric pressure at 2000 rpm for 15 seconds. The pressure was reduced from atmospheric pressure to a vacuum of 5 Torr while further kneading at 2000 rpm for 90 seconds. The knead was allowed to stand in a container in a water bath set to 25° C. and cooled for 1 hour to prepare a composite material.

(Evaluation of Fluidity)

The effect of smoothing of the form of the particle surfaces on the fluidity of the composite material was judged from the results of evaluation of the viscosity of the composite material prepared. The results are shown in Table 2.

The viscosities of the composite materials prepared in the above way (unit: μ[Pa·S]) were measured. For measurement of the viscosity, a rheometer was used. An MCR-102 made by Anton Paar GmbH was used. Diameter 50 mm parallel plates PP50 were set at 1 mm blade gaps. A range of 0.1 to 100 rad/s was measured under conditions of a shear strain of 0.1% and a measurement temperature of 28.5° C. in the frequency dispersion mode.

Further, in Comparative Example 3 to Comparative Example 9, the viscosity was not measured for the following reasons.

In Comparative Example 3, the amount of addition of Zr exceeded 10.00 mass %, so the amount of formation of the second phase comprised of Al—Zr—O or Al—Zr—N became greater and was deemed outside the scope of measurement of viscosity. Further, in Comparative Example 4, when heat treating the alumina at a temperature of less than 1700° C., a reduction nitridation reaction of the alumina became hard to occur and the AlN conversion rate became low, so similarly this was deemed outside the scope of measurement of viscosity. On the other hand, in Comparative Example 5, if heat treating by a temperature higher than 1800° C., the AlN conversion rate becomes a high 88.0% and it was confirmed that the AlN particles formed by reduction nitridation stuck together. If mixing such AlN particles with a resin, the resin became more viscous and could not be uniformly mixed. As a result, the viscosity could not be measured. Furthermore, both if using an alumina powder with an average particle size (D50) of the alumina material of less than 0.02 μm (Comparative Example 6) and if using an alumina powder with an average particle size (D50) of larger than 4.70 μm (Comparative Example 7), if mixing it with a resin for measurement of the viscosity, it is not possible to uniformly mix them due to the effects of the viscosity and the viscosity is not measured. In the particles of Comparative Example 6, as a result of examination of the cross-section, voids remained inside the particles. On the other hand, in the particles of Comparative Example 7, the granules easily broke and the circularity was low. In Comparative Example 8, if mixing 19.2 mass % of carbon powder (activated carbon) with respect to the alumina component 100 mass % in the granules, the AlN conversion rate became a low 69.1%, so this was outside the scope of measurement of viscosity. Furthermore, in Comparative Example 9 with an amount of carbon mixed in the material mixing step of over 2.1 mass, it was confirmed that the voids in the particles became greater and further the circularity deteriorated. When mixed with a resin, such particles cannot be uniformly mixed due to the viscosity and the viscosity was not measured.

The fluidity was judged indicating a sample with a reduction of viscosity of 75% or more with respect to the viscosity (Pa·s) at the time of a shear speed 1 (rad/s) of a composite material comprised of the spherical AlN particles prepared without addition of $ZrO_2$ powder shown in Comparative Example 1 and a resin as "very good", a sample with a reduction of viscosity of 50% or more as "good", and a sample with one of less than 50% as "poor".

The samples with a reduction of viscosity of 50% or more were all particles with particle growth of the AlN particles which was restrained and given smooth surfaces. As a result, it was judged that the viscosity of the resin knead fell. The viscosity at the time of the shear speed 1 (rad/s) of the knead of the powder comprised of the AlN particles shown in Comparative Example 1 and a resin was 4363(Pa·s). If comparing Examples 1 to 5 and Comparative Examples 1 to 3, the fact that the amount of addition of Zr, converted to the $ZrO_2$ component, has to be at least 0.10 mass % or more will be understood from the results of Example 3 and Comparative Example 2. If $ZrO_2$ is overly added, sometimes a foreign phase of Si—Zr—O will enter, but with an amount of addition of 10.00 mass % (Example 5), restrained particle growth is seen in the surface properties. As a result, the fluidity of the composite material was judged "good".

The properties of the spherical AlN particles of the examples (invention examples) and the comparative examples are shown in Table 2.

TABLE 2

| | | Ex. 1 | Ex. 2 | Ex. 3 | Ex. 4 | Ex. 5 | Ex. 6 |
|---|---|---|---|---|---|---|---|
| Spherical AlN particles | Circularity | 0.90 | 0.88 | 0.96 | 0.94 | 0.95 | 0.91 |
| | Average particle size, μm | 40 | 38 | 38 | 37 | 39 | 39 |
| | AlN conversion rate, % | 81.5 | 81.8 | 82.0 | 82.2 | 81.9 | 71.0 |
| | Surface properties | Particle growth restrained | Particle growth restrained | Particle growth restrained | Particle growth restrained | Particle growth restrained | Particle growth restrained |
| Composite material | Viscosity, Pa · s | 778 | 1084 | 2085 | 998 | 1545 | 852 |
| | Rate of drop of viscosity, % | 82.2 | 75.2 | 52.2 | 77.1 | 64.6 | 80.4 |
| | Judgment | Very good | Very good | Good | Very good | Good | Very good |

| | | Ex. 7 | Ex. 8 | Ex. 9 | Ex. 10 | Ex. 11 |
|---|---|---|---|---|---|---|
| Spherical AlN particles | Circularity | 0.88 | 0.90 | 0.91 | 0.88 | 0.85 |
| | Average particle size, μm | 41 | 29 | 26 | 39 | 38 |
| | AlN conversion rate, % | 86.0 | 84.6 | 77.6 | 90.8 | 92.9 |
| | Surface properties | Particle growth restrained | Particle growth restrained | Particle growth restrained | Particle growth restrained | Particle growth restrained |

TABLE 2-continued

| | | | | | | | |
|---|---|---|---|---|---|---|---|
| | Composite material | Viscosity, Pa · s | 790 | 903 | 1443 | 990 | 1115 |
| | | Rate of drop of viscosity, % | 81.9 | 79.3 | 66.9 | 77.3 | 74.4 |
| | | Judgment | Very good | Very good | Good | Very good | Good |

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Spherical AlN particles | Circularity | 0.86 | 0.86 | 0.91 | 0.85 | 0.75 | 0.80 | 0.81 | 0.84 | 0.79 |
| | Average particle size, μm | 38 | 39 | 41 | 39 | 37 | 20 | 28 | 38 | 38 |
| | AlN conversion rate, % | 81.5 | 82.0 | — | 66.0 | 88.0 | 88.0 | 73.0 | 69.1 | 81.0 |
| | Surface properties | Particle growth | Particle growth | — | — | — | — | — | — | — |
| Composite material | Viscosity, Pa · s | 4363 | 3763 | | | | | | | |
| | Rate of drop of viscosity, % | — | 13.8 | | | | | | | |
| | Judgment | Poor | Poor | | | | | | | |

(Firing Temperature in Nitrogen Atmosphere (Examples 1, 5, and 6 and Comparative Examples 4 and 5))

At a temperature of less than 1700° C. (Comparative Example 4), a reduction nitridation reaction of alumina becomes hard to occur and particles with a low AlN conversion rate result, so this is not preferable. If performing heat treatment at a temperature higher than 1800° C. (Comparative Example 5), the AlN particles formed by the reduction nitridation start to stick to each other and the particles are joined together. At a further higher temperature, the AlN particles start to break down, so this is not preferable. The firing temperature of the AlN particles of the present invention is 1700° C. to 1800° C.

(Material Alumina Particle Size)

As the material of the alumina, in the examples and comparative examples, alumina powder with an average particle size (D50) of 0.02 to 4.70 μm was used. If using alumina powder with an average particle size of a small 0.02 μm (Comparative Example 6), in the granulation step, the filling rate of the alumina powder in the granules obtained by granulation and drying easily became lower, so voids remained in the finally obtained spherical AlN particles. If using alumina powder larger than 4.70 μm (Comparative Example 7), the strength of the granules became low, the granules formed spherically easily broke, and the circularity of the obtained AlN particles fell. Due to these effects, the particles of all of the comparative examples had circularities fallen below 0.85.

(Addition of Carbon Powder to Granules)

In an example where the amount of carbon powder added to the granules is less than 20.0 mass % (Comparative Example 8), a reduction nitridation reaction of alumina becomes hard to occur and the result becomes particles with an AlN conversion rate lower than 70.0%. To raise the AlN conversion rate, it is necessary to raise the heating temperature or take other measures. If the amount of carbon powder is too small, even if raising the heating temperature or taking other measures, it is no longer possible to make the AlN conversion rate 70.0% or more. Therefore, the amount of carbon power added to the granules is preferably made 20.0 mass % or more.

(Addition of Carbon in Material Mixing Step)

If mixing carbon powder in the material mixing step (Examples 10 and 11), it was possible to obtain AlN particles with a 90% or more high AlN conversion rate. In an example where the amount of carbon mixed in the material mixing step exceeded 2.1 mass % (Comparative Example 9), while the reduction nitridation reaction is promoted, when the AlN particles are formed, the locations where the carbon powder was present become voids, so the surface morphology and circularity both deteriorated. The result became AlN particles with large internal voids, so from the viewpoint of securing a high thermal conduction, 2.1 mass % or less is preferable.

The invention claimed is:

1. Spherical AlN particles in the form of a powder containing Zr atoms with respect to Al atoms in an amount of a molar ratio $Zr/Al=4.0\times10^{-4}$ to $4.2\times10^{-2}$, having an AlN conversion rate of 70.0% or more, and having a circularity of 0.85 to 1.00, wherein the spherical AlN particles containing Zr atoms are sintered.

2. The spherical AlN particles according to claim 1, wherein the AlN conversion rate is 90.0% or more.

3. A composite material of a resin and spherical AlN particles comprising the spherical AlN particles according to claim 1 in a resin.

4. A method of producing the spherical AlN particles according to claim 1, the method of producing the spherical AlN particles comprising a material mixing step of mixing into an alumina material powder of an average particle size (D50) of 0.05 to 4.00 μm having one or both of an alumina powder and alumina hydrate powder a material powder of a Zr compound in 0.10 to 10.00 mass %, converted to a $ZrO_2$ component, by outer percentage with respect to 100 mass % of the alumina material powder converted to the alumina component, a granulating step of processing the mixture formed in the material mixing step into spherical granules, a carbon powder mixing step of mixing the spherical granules with carbon powder, and a nitridation step of heat treating the mixture formed in the carbon powder mixing step in a nitrogen-containing atmosphere.

5. The method of producing the spherical AlN particles according to claim 4, wherein the ratio of carbon powder mixed with the spherical granules in the carbon powder mixing step is 20.0 to 40.0 mass % by outer percentage with respect to 100 mass % of alumina material powder in the spherical granules converted to the alumina component.

6. The method of producing the spherical AlN particles according to claim 4, in the material mixing step, further mixing into the alumina material powder a carbon powder in 0.3 to 2.1 mass % by outer percentage with respect to 100 mass % of the alumina material powder converted to the alumina component.

* * * * *